United States Patent
Naydenov (10) Patent No.: US 8,181,516 B2
(45) Date of Patent: May 22, 2012

(54) MEASURING A LIQUID LEVEL IN A TANK WITH TWO MEASUREMENT CAPACITORS AND TWO REFERENCE CAPACITORS

(75) Inventor: Volodia Naydenov, Louvain-La-Neuve (BE)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 528 days.

(21) Appl. No.: 12/446,416

(22) PCT Filed: Oct. 26, 2007

(86) PCT No.: PCT/EP2007/061517
§ 371 (c)(1),
(2), (4) Date: Apr. 20, 2009

(87) PCT Pub. No.: WO2008/049913
PCT Pub. Date: May 2, 2008

(65) Prior Publication Data
US 2010/0294035 A1  Nov. 25, 2010

(30) Foreign Application Priority Data
Oct. 26, 2006  (FR) ..................................... 06 09413
Apr. 13, 2007  (FR) ..................................... 07 54463

(51) Int. Cl.
*G01F 23/26* (2006.01)
(52) U.S. Cl. ................................................... 73/304 C
(58) Field of Classification Search .................. 73/304 C
See application file for complete search history.

(56) References Cited

U.S. PATENT DOCUMENTS

| | | | |
|---|---|---|---|
| 4,296,630 A | | 10/1981 | Jung et al. |
| 4,418,569 A | * | 12/1983 | Kuhnel .................... 73/304 C |
| 6,016,697 A | * | 1/2000 | McCulloch et al. ......... 73/304 C |
| 6,539,797 B2 | * | 4/2003 | Livingston et al. ......... 73/304 C |
| 6,578,416 B1 | * | 6/2003 | Vogel et al. ................ 73/304 C |
| 2003/0000303 A1 | * | 1/2003 | Livingston et al. ......... 73/304 C |

(Continued)

FOREIGN PATENT DOCUMENTS

EP  1521065 A1  4/2005

(Continued)

OTHER PUBLICATIONS

PCT International Search Report dated Feb. 8, 2008 for International Application No. PCT/EP2007/061517 (2 p.).

(Continued)

*Primary Examiner* — Nathaniel Kolb
(74) *Attorney, Agent, or Firm* — Beatrice C. Ortego (57) ABSTRACT

Process for measuring a liquid level in a tank and a system suitable for such process that consists in:
- positioning, in the tank, two substantially identical reference capacitors and two substantially identical measurement capacitors so that, when the tank is full, the four capacitors are submerged and so that, when the liquid level in the tank falls, a measurement capacitor/reference capacitor pair (Cmeas2, Cref2) emerges before another pair of capacitors (Cmeas1, Cref1);
- measuring the four capacitors Cmeas1, Cref1, Cmeas2, Cref2 in air when they are in air; and
- when at least one capacitor is at least partly immersed in the liquid, measuring the value of the four capacitors, and calculating the liquid level in the tank from the measured value of the capacitor partly immersed in the liquid, its value previously measured in air, and the measured values of the other capacitors.

9 Claims, 3 Drawing Sheets

U.S. PATENT DOCUMENTS

| | | |
|---|---|---|
| 2004/0073386 A1 | 4/2004 | Benedetti |
| 2008/0223128 A1 | 9/2008 | Naydenov |
| 2008/0229820 A1 | 9/2008 | Naydenov |
| 2008/0276704 A1 | 11/2008 | Naydenov |

FOREIGN PATENT DOCUMENTS

| | | |
|---|---|---|
| WO | WO0026619 A1 | 5/2000 |
| WO | WO0102817 A1 | 1/2001 |
| WO | WO2006064013 A1 | 6/2006 |
| WO | WO2006067148 A1 | 6/2006 |
| WO | WO2006067149 A1 | 6/2006 |

OTHER PUBLICATIONS

U.S. Appl. No. 11/721,851, filed Jun. 15, 2007, Massa et al., WO2006064013.

U.S. Appl. No. 60/949,550, filed Jul. 13, 2007, Thompson et al.

U.S. Appl. No. 11/793,542, filed Jun. 21, 2007, Barlesi et al., WO2006067149.

U.S. Appl. No. 11/722,405, filed Jun. 21, 2007, Barlesi et al., WO2006067148.

* cited by examiner

MEASURING A LIQUID LEVEL IN A TANK WITH TWO MEASUREMENT CAPACITORS AND TWO REFERENCE CAPACITORS

CROSS-REFERENCE TO RELATED APPLICATIONS

The present application is a U.S. national stage application under 35 U.S.C. §371 of International Application No. PCT/EP2007/061517 filed Oct. 26, 2007, which claims the benefit of French Application Serial no. 06.09413 filed Oct. 26, 2006 and of French Application Serial no. 07.54463 filed Apr. 13, 2007, these applications being incorporated herein by reference in their entirety for all purposes.

INTRODUCTION

The present invention relates to a process for measuring a liquid level in a tank using a capacitive gauge, in particular for determining the level of fuel in a fuel tank. The invention also relates to a liquid level measurement system suitable for said process.

PRIOR ART

Many devices have been proposed to date for measuring the liquid level in a tank and, in particular, in a fuel tank of a motor vehicle. These known devices generally use level sensors or gauges that deliver a signal representative of the level of fuel in the tank.

In one variant, these level sensors or gauges comprise an electrical capacitor used for the measurement (measurement capacitor) and an electrical capacitor used for reference (reference capacitor). The measurement capacitor is generally present over the entire height of the tank, and its capacitance varies according to the height of fuel in the tank. The reference capacitor is permanently submerged in the fuel and has a value which depends on the nature of the fuel (through the dielectric constant characteristic of the fuel). An appropriate electronic circuit determines the level of fuel in the tank. The capacitors of these sensors may be flat or cylindrical plates between which the fuel can fall and rise and influence the capacitance by skin effect. Alternatively, they can be interdigital electrodes (engaged comblike) which interact by interference effect; these are affixed to a support and look like printed circuits. Such electrodes may furthermore be manufactured by manufacturing processes similar to those of printed circuits.

Thus, U.S. Pat. No. 4,296,630 discloses capacitive gauges with interference effect comprising interdigital electrodes obtained by etching a metallic layer affixed to a ribbon-shaped flat and flexible support. To ensure the correct operation of such a capacitive gauge, it must be calibrated. This calibration generally takes place during installation of the capacitive gauge.

For capacitive gauges as described in US '630, Application WO 01/02817 gives formulas to calculate the level of fuel in the tank. The level of fuel is generally calculated by means of the following formula:

$$\text{Level} = K \times (C_{meas} - C_{Air}) \quad (1)$$

where K=scale factor; Cmeas=capacitor of the gauge partly immersed in the fuel; CAir=capacitor of the gauge in the air.

Application WO 01/02817 gives also a variant of formula (1) that allows to calculate the level of the fuel independently of the variations of dielectric characteristics of the fuel for a gauge comprising a measurement capacitor and a reference capacitor:

$$\text{Level} = \frac{C_{refAir}}{C_{ref} - C_{refAir}} * \frac{C_{meas} - C_{measAir}}{C_{measAir}} \quad (2)$$

with Cref=reference capacitance in the liquid; CrefAir=reference capacitance in air; Cmeas=measurement capacitance in the liquid; and CmeasAir=measurement capacitance in air. The capacitances CrefAir and CmeasAir in air are only measured once, that is to say during calibration of the capacitive gauge. These values are then stored as constants in a memory of an electronic circuit.

The drawback with these measurement systems is that the capacitances measured in air vary as a function, for example, of the temperature and ageing of the system. By ignoring these variations, as the conventional systems of the prior art do, determination of the fuel level in the tank cannot be accurate.

OBJECTS OF THE INVENTION

The object of the present invention is to provide a process for measuring a liquid level in a tank using a capacitive gauge that enables accurate determination of the liquid level in the tank. One subject of the invention is also a liquid level measurement system suitable for said process.

GENERAL DESCRIPTION OF THE INVENTION CLAIMED WITH ITS MAIN ADVANTAGES

For this purpose, the invention relates to a process for measuring a liquid level in a tank that consists in:
  positioning, in the tank, two reference capacitors that are substantially identical and two measurement capacitors that are also substantially identical in such a way that, when the tank is full, the 4 capacitors are submerged and that, when the liquid level in the tank falls, a measurement capacitor/reference capacitor pair (Cmeas2, Cref2) emerges before another pair of capacitors (Cmeas1, Cref1);
  when the 4 capacitors Cmeas1, Cref1, Cmeas2, Cref2 are in air, measuring the 4 capacitors in air; and
  when at least one capacitor is at least partly immersed in the liquid, measuring the value of said capacitor, measuring the values of the other capacitors and calculating the liquid level in the tank from the measured value of the capacitor partly immersed in the liquid, the value in air measured previously of the capacitor partly immersed in the liquid and the measured values of the other capacitors.

In the process according to the invention, the two reference capacitors are substantially identical, as are the two measurement capacitors, that is to say that their shape and their structure are identical and that their respective dimensions only differ from one another by at most 5%, and preferably by at most 2%.

The process according to the invention makes it possible to calculate the liquid level in the tank while taking into account variations of the values in air of the reference and measurement capacitors. This is because the value of the capacitors depends on the value in air (i.e. when the capacitor is not immersed in the liquid) and on the value in the liquid (i.e. when the capacitor is at least partly immersed in the liquid, the value of the capacitance depending on the dielectric constant of the liquid). The values in air of the reference and measurement capacitors are measured every time that these capacitors are not immersed in the liquid so that the calculation of the liquid level takes into account the temperature variations in the tank and the ageing of the capacitors.

In one particular embodiment of the process according to the invention, the values in air Cref1Air, Cref2Air, Cmeas1Air, Cmeas2Air have been measured and stored in the memory of an evaluation unit, these capacitors being positioned in the tank so as to cover the entire height of the tank continuously and so that, when the liquid level in the tank falls, these capacitors begin respectively to emerge at the maximum fill height of the tank $lev4_{max}$ for Cref2 and at levels $lev3_{max}$ for Cmeas2, $lev2_{max}$ for Cmeas1 and $lev1_{max}$ for Cref1 with $lev4_{max} > lev3_{max} > lev2_{max} > lev1_{max}$, said process using the evaluation unit to carry out the following steps:

a) measuring the value of all the capacitors Cref1, Cref2, Cmeas1, Cmeas2 and evaluating which are completely in air by comparison in pairs: Cref2 with Cref1 and Cmeas2 with Cmeas1;

b) calculating the liquid level in the tank from the following formulae:

$$lev1 = K1 \times (Cref1 - Cref2)$$

when only the first reference capacitor is at least partly immersed in the liquid;

$$lev2 = lev1_{max} + K2 \times \frac{(Cmeas1 - Cmeas2)}{(Cref1 - Cref2)}$$

when the first reference capacitor is submerged and the first measurement capacitor is, in addition, at least partly immersed in the liquid;

$$lev3 = lev2_{max} + K3 \times \frac{(Cmeas2 - Cmeas1Air)}{(Cref1 - Cref2)}$$

when the first reference capacitor and the first measurement capacitor are submerged and the second measurement capacitor is, in addition, at least partly immersed in the liquid; and $$lev4 = lev3_{max} + K4 \times (Cref2 - Cref1Air)$$

when the first reference capacitor, the first measurement capacitor and the second measurement capacitor are submerged and the second reference capacitor is, in addition, at least partly immersed in the liquid, K1, K2, K3 and K4 being proportionality coefficients that depend on the geometry of the capacitive gauge and Cmeas1Air and Cref1Air being the values of Cmeas1 and Cref1 effectively measured when these have been completely exposed to the air; and c) replacing, in the memory, the values of the capacitors in air stored previously with their measured value, where appropriate.

The level values $lev1_{max}$, $lev2_{max}$, $lev3_{max}$, $lev4_{max}$ are obtained from the geometry of the gauge or more exactly from the geometry of the 4 capacitors i.e. the dimensions of the 4 capacitors. $lev1_{max}$ depends on the geometry of Cref1, $lev2_{max}$ depends on the geometry of Cref1 and Cmeas1, $lev3_{max}$ depends on the geometry of Cref1, Cmeas1 and Cmeas2, $lev4_{max}$ depends on the geometry of Cref1, Cmeas1, Cmeas2 and Cref2.

The term capacitor "submerged" in a liquid is understood to mean a capacitor completely immersed in said liquid.

The invention also relates to a system for measuring a liquid level in a tank suitable for said process according to the invention, the system comprising:

a capacitive gauge with a first measurement capacitor (Cmeas1) and a first reference capacitor (Cref1); and an evaluation unit connected to the capacitive gauge with a calculation means for calculating the liquid level based on signals coming from the capacitive gauge, characterized in that the capacitive gauge comprises, in addition, a second measurement capacitor (Cmeas1) substantially identical to Cmeas1 and a second reference capacitor (Cref2) substantially identical to Cref1.

The second measurement capacitor and the second reference capacitor may each, when they are not immersed in the liquid, supply a value of the capacitance in air which may be used to calibrate the capacitive gauge. The calibration capacitor used in known systems may be replaced by a supplementary capacitor whose capacitance may be measured in air during the use of the capacitive gauge. It is, however, not excluded to also provide a conventional calibration capacitor in the evaluation unit to compensate for the ageing of the system.

According to the invention, the gauge generally comprises a support on which the various capacitors are positioned, the support possibly being a single support or, in particular, being composed of at least two components in such a way that the first measurement capacitor and the first reference capacitor are positioned on a first component and the second measurement capacitor and the second reference capacitor are positioned on a second component.

According to one embodiment, the capacitive gauge comprises a support with a first end and a second end, the various capacitors preferably being positioned on the support in the following order, going from the first end towards the second end:

first reference capacitor (Cref1);
first measurement capacitor (Cmeas1);
second measurement capacitor (Cmeas2); and
second reference capacitor (Cref2).

According to one particularly advantageous embodiment, the various capacitors are positioned on the support symmetrically relative to a median line between the first end and the second end. Thus, for example, when the two measurement capacitors are structurally identical and, when one of the measurement capacitors can be measured in air, the latter one may act as a calibration capacitor for the other of the measurement capacitors. The calibration capacitance is thus not a value that is only calculated once before or during the installation of the system, but a value that is measured regularly during the normal operation of the system. A more accurate measurement of the liquid level in the tank may thus be achieved since the calibration value is regularly updated and the system automatically compensates for the changes due to the ageing of the system.

The reference capacitors may each cover a substantially smaller area than that which each of the measurement capacitors may cover. The reference capacitors have a height generally less than or equal to 10 mm, preferably less than or equal to 8 mm, or even less than or equal to 5 mm, whereas the measurement capacitors may extend over about 450 mm. These dimensions correspond to one embodiment of the invention and generally depend on the geometry of the tank in which the capacitive gauge is installed. The main use of the reference capacitor is to determine the type of liquid in the tank from the value of the dielectric constant of the liquid.

The measurement and/or reference capacitors are preferably formed, in each case, by two interdigital electrodes and connection terminals are preferably provided to connect the measurement and reference capacitors to the evaluation unit.

The expression "interdigital electrodes" is understood to mean electrodes having a maze shape with finger-shaped loops engaged comblike with one another. Preferably, these fingers extend vertically and the fact of positioning the gauge vertically in the tank thus makes it possible to obtain a signal that is substantially linear as a function of the liquid level to be measured.

According to one advantageous aspect of the invention, the evaluation unit comprises a memory to temporarily store the values of the various capacitors measured in air. This aspect proves particularly advantageous in the case where the working area of the capacitive gauge extends over the entire length of the capacitive gauge. Although it is not possible to directly measure the value in air of a measurement capacitor when the tank is at least half full, the operation of the capacitive gauge is not compromised. This is because, when the value of a measurement capacitor cannot be measured in air, the value measured previously, and stored in the memory of the evaluation unit, is used.

The calculation means of the measurement system is preferably designed to determine the liquid level in the tank according to the respective formulae below:

$$lev1 = K1 \times (Cref1 - Cref2)$$

when the first reference capacitor is at least partly immersed in the liquid;

$$lev2 = lev1_{max} + K2 \times \frac{(Cmeas1 - Cmeas2)}{(Cref1 - Cref2)}$$

when the first reference capacitor is submerged in the liquid and the first measurement capacitor is at least partly immersed in the liquid;

$$lev3 = lev2_{max} + K3 \times \frac{(Cmeas2 - Cmeas1Air)}{(Cref1 - Cref2)}$$

when the first reference capacitor and the first measurement capacitor are submerged in the liquid and the second measurement capacitor is at least partly immersed in the liquid; and $$lev4 = lev3_{max} + K4 \times (Cref2 - Cref1Air)$$

when the first reference capacitor, the first measurement capacitor and the second measurement capacitor are submerged in the liquid and the second reference capacitor is at least partly immersed in the liquid,
K1, K2, K3 and K4 being proportionality coefficients that depend on the geometry of the capacitive gauge.

The present invention is illustrated in a non exhaustive way by the appended FIGS. 1 to 3.

FIG. 1 shows a schematic view of a liquid level measurement device according to the invention, whereas

Figure 1:
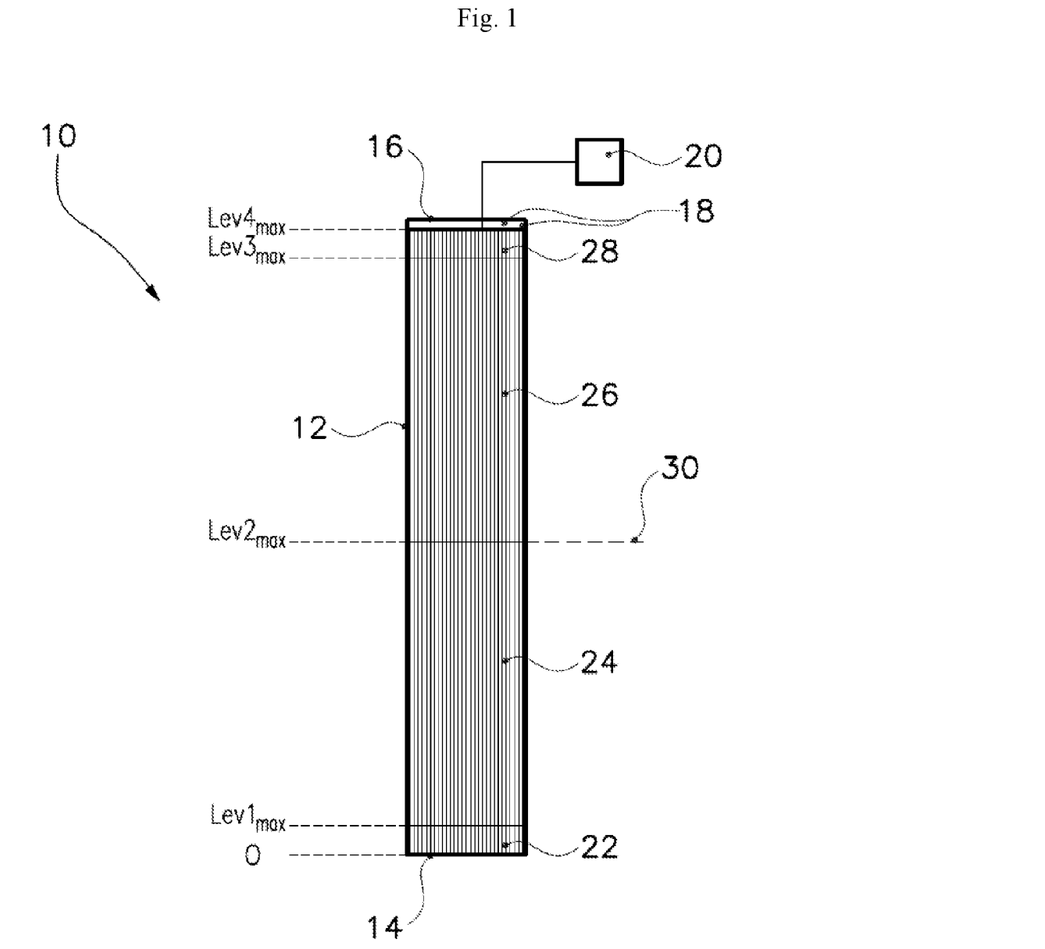

FIG. 1 shows a capacitive gauge 10 comprising a support 12 on which the measurement and reference capacitors are positioned. The support 12 has a first end 14 intended to be immersed in the bottom of a tank and a second end 16 comprising connection terminals 18 for connection to the evaluation unit 20. The various capacitors are positioned on the support 12 in the following order, going from the first end 14 towards the second end 16: a first reference capacitor 22; a first measurement capacitor 24; a second measurement capacitor 26; and a second reference capacitor 28. The capacitors are positioned on the support 12 symmetrically relative to a median line, shown by a dotted line 30, between the first end 14 and the second end 16 of the support 12. In the case represented in FIG. 1, the size and the structure of the two reference capacitors 22, 28 are identical and the size and the structure of the two measurement capacitors 24, 26 are identical.

Each capacitor 22, 24, 26, 28 is formed by a pair of interdigital electrodes for which, in each case, one end extends to the second end 16 to form the connection terminals 18 for connection to the evaluation unit 20.

The evaluation unit 20 comprises a calculation means (not shown) that makes it possible to calculate the liquid level as a function of the proportion of the capacitive gauge 10 immersed in the liquid.

For the calculation of the liquid level in the tank it is useful to know, for each capacitor, the value of the capacitor immersed in the liquid and the value of the capacitor in the air. The value of the capacitor in the air allows a calibration of the capacitive gauge to be established.

Figure 2:
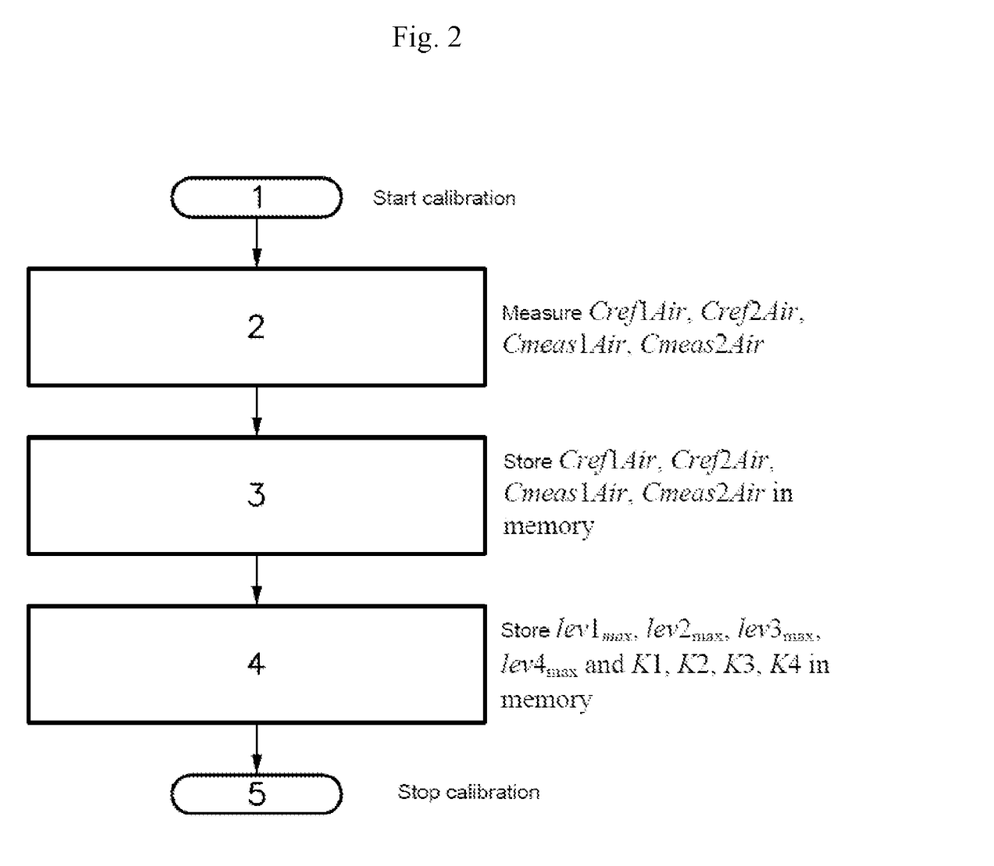
FIGS. 2 and 3 illustrate respectively a flow-chart with the steps of a calibration of a gauge and a flow-chart with the steps of a process for measuring a liquid level in a tank according to the invention.

The steps of the calibration of the gauge are described in FIG. 2.

Steps 1 and 5 correspond respectively to the start and the end of the calibration.

During step 2, values in air Cref1Air, Cref2Air, Cmeas1Air, Cmeas2Air of the reference and the measurement capacitors are measured.

Then, during step 3, the measured values in step 2 are stored in a memory of the evaluation unit.

Eventually, in step 4, values $lev1_{max}$, $lev2_{max}$, $lev3_{max}$, $lev4_{max}$ and K1, K2, K3, K4 are stored in the memory of the evaluation unit.

The symmetrical structure of the capacitive gauge makes it possible to calculate the fuel level while avoiding the recourse to calibration capacitors.

Preferably, the first reference capacitor 22 is always submerged in the liquid. This enables the first reference capacitor 22 to be used for determining the type of liquid in the tank.

For the calculation of the liquid level in the tank, there are four scenarios:
i) only the first reference capacitor 22 is immersed in the liquid;
ii) the first reference capacitor 22 is submerged and the first measurement capacitor 24 is immersed in the liquid, the other 2 capacitors 26 and 28 being in air;
iii) the first reference capacitor 22 and the first measurement capacitor 24 are submerged, the second measurement capacitor 26 is immersed in the liquid and the second reference capacitor 28 is in air; and
iv) the first reference capacitor 22 and the two measurement capacitors 24, 26 are submerged and the second reference capacitor 28 is immersed in the liquid.

Scenario i:

In scenario i), that is to say when the tank is almost empty, the two measurement capacitors 24, 26 and the second reference capacitor 28 are measured in air.

When only the first reference capacitor 22 is immersed in the liquid:
Cref1 varies as a function of the liquid level;
Cmeas1 is a constant measured by the system and Cmeas1=Cmeas1Air;

Cmeas2 is a constant measured by the system and Cmeas2=Cmeas2Air; and

Cref2 is a constant measured by the system and Cref2=Cref2Air.

From formula (1) described above, the liquid level lev1 in the tank is determined according to the formula:

$$lev1 = K1 \times (Cref1 - Cref2)$$

in which K1 is a proportionality coefficient that depends on the geometry of the capacitive gauge.

It should be noted that in scenario i) all the values of the measurement and reference capacitors used in the calculation of the level are measured. No calibration capacitance is required and a more accurate liquid level can be determined. The values of the measurement capacitors 24, 26 in air are temporarily stored in the memory for later use:

C' meas1Air=Cmeas1=Cmeas1Air and

C' meas2Air=Cmeas2=Cmeas2Air

The values C' meas1Air and C' meas2Air are overwritten each time that the respective measurement capacitors 24, 26 can be measured in air.

The value of the second reference capacitor 28 measured in air C' ref2Air is preferably also stored in the memory for later use: C' ref2Air=Cref2Air.

Scenario ii:

In scenario ii), that is to say when the tank is at most half full, the first measurement capacitor 24 is at least partly immersed in the liquid and cannot be measured in air.

The first reference capacitor 22 is submerged in the liquid;

the level $lev1_{max}$ is a constant determined by the geometry of the capacitive gauge;

Cref1 is a constant measured by the system;

Cmeas1 varies as a function of the liquid level;

Cmeas2 is a constant measured by the system and Cmeas2=Cmeas2Air; and

Cref2 is a constant measured by the system and Cref2=Cref2Air.

From formula (2) described above, in which CrefAir=Cref2Air, Cref=Cref1, Cmeas=Cmeas1 and CmeasAir=Cmeas2Air, the liquid level lev2 in the tank is determined according to the formula:

$$lev2 = lev1_{max} + K2 \times \frac{(Cmeas1 - Cmeas2)}{(Cref1 - Cref2)}$$

in which K2=Cref2Air/Cmeas2Air and is a proportionality coefficient that depends on the geometry of the capacitive gauge and $lev1_{max}$ corresponds to the level at which the first reference capacitor 22 is submerged and the first measurement capacitor 24 is not yet submerged in the liquid. The value $lev1_{max}$ is, in this case, a constant determined by the geometry of the capacitive gauge.

It should be noted that in scenario ii) all the values of the measurement and reference capacitors used in the calculation of the level are measured. No calibration capacitance is required and a more accurate liquid level can be determined. The value of the second measurement capacitor 26 in air is temporarily stored in the memory for later use:

C' meas2Air=Cmeas2=Cmeas2Air.

The value C' meas2Air is overwritten by the value of Cmeas2 measured in air.

The value of the second reference capacitor 28 measured in air is preferably also stored in the memory for later use: C' ref2Air=Cref2Air.

Since the values Cref2Air and Cmeas2Air are measured in the course of this step, K2 is recalculated in the course of this step so as to take into account the evolution of the values of the capacitors according to the time and the temperature of the liquid.

Scenario iii:

In scenario iii), the tank is at least half full and neither of the measurement capacitors 24, 26 can be measured in air. In this case, it is necessary to use the values C' meas1Air and C' meas2Air previously stored in the memory.

When the first reference capacitor 22 and the first measurement capacitor 24 are submerged and the second measurement capacitor 26 is at least partly immersed in the liquid:

the level $lev2_{max}$ is a constant determined by the geometry of the capacitive gauge;

Cref1 is a constant measured by the system;

Cmeas1 is a constant measured by the system;

Cmeas2 varies as a function of the liquid level; and

Cref2 is a constant measured by the system and Cref2=Cref2Air.

As for scenario ii), from formula (2) described above, the liquid level lev3 in the tank is determined according to the formula:

$$lev3 = lev2_{max} + K3 \times \frac{(Cmeas2 - Cmeas1Air)}{(Cref1 - Cref2)}$$

in which K3 is a proportionality coefficient that depends on the geometry of the capacitive gauge and $lev2_{max}$ corresponds to the level at which the first measurement capacitor 24 is submerged and the second measurement capacitor 26 is not yet submerged in the liquid. The value $lev2_{max}$ is, in this case, a constant determined by the geometry of the capacitive gauge.

It should be noted that in scenario iii), the values C' meas1Air and C' meas2Air that are stored in the memory are used. These values are temporarily considered to be constants. Since these values are regularly overwritten during the measurements in scenarios i) and ii), these values are up to date and enable sources of errors to be compensated for.

Scenario iv:

In scenario iv), that is to say when the tank is essentially full, none of the capacitors can be measured in air. In this case, it is necessary to use the values C' meas1Air, C' meas2Air and C' ref2Air previously stored in the memory.

When the first reference capacitor 22, the first measurement capacitor 24 and the second measurement capacitor 26 are submerged and the second reference capacitor 28 is at least partly immersed in the liquid:

the level $lev3_{max}$ is a constant determined by the geometry of the capacitive gauge;

Cref1 is a constant measured by the system;

Cmeas1 is a constant measured by the system;

Cmeas2 is a constant measured by the system; and

Cref2 varies as a function of the liquid level.

From formula (1) described above, the liquid level lev4 in the tank is determined according to the formula:

$$lev4 = lev3_{max} + K4 \times (Cref2 - Cref1Air)$$

in which K4 is a proportionality coefficient that depends on the geometry of the capacitive gauge and $lev3_{max}$ corresponds to the level at which the second measurement capacitor 26 is completely submerged and the second reference capacitor 28 is not yet submerged in the liquid. The value $lev3_{max}$ is, in this case, a constant determined by the geometry of the capacitive gauge. Due to the symmetry of the capacitive gauge, Cref1Air may be substituted by Cref2Air and it is possible to use the value C' ref2Air previously stored in the memory.

It should be noted that in scenario iv), the values C' meas1Air, C' meas2Air and C' ref2Air that are stored in the memory are used. These values are temporarily considered to be constants. Since these values are regularly overwritten during the measurements in scenarios i) and ii), these values are up to date and enable sources of errors to be compensated for.

Figure 3:
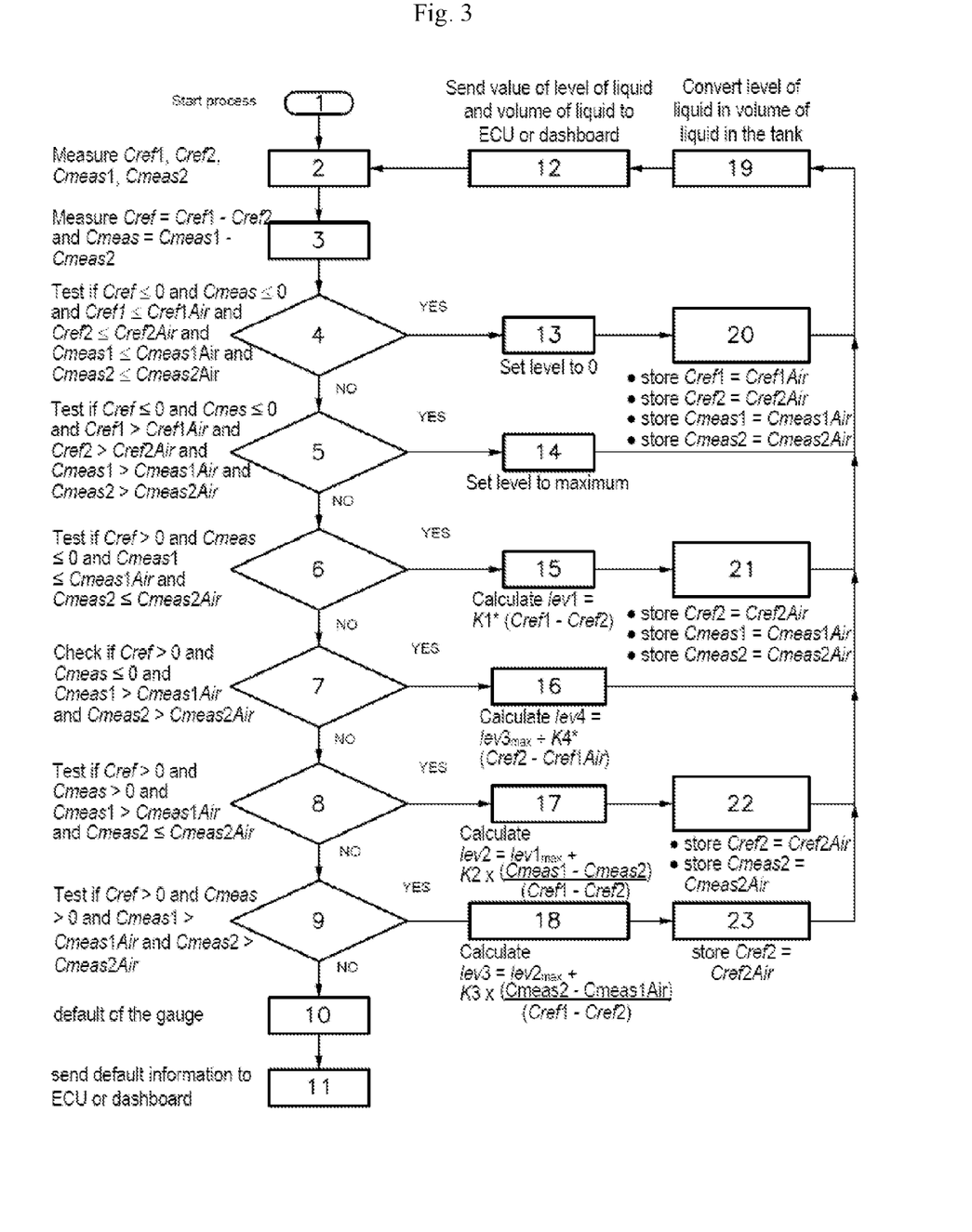

FIG. 3 describes the flow-chart of the process for measuring the level of liquid in the tank and details the sequence of steps needed for treating the 4 scenarios as described above.

Step 1 corresponds to the start of the measuring process.

Step 2: during this step, the values Cref1, Cref2, Cmeas1, Cmeas2 of the 2 reference capacitors and of the 2 measurement capacitors are measured.

Step 3: the values Cref=Cref1−Cref2 and Cmeas=Cmeas1−Cmeas2 are measured.

Step 4: it is tested if Cref≦0 and Cmeas≦0 and Cref1≦Cref1Air and Cref2≦Cref2Air and Cmeas1≦Cmeas1Air and Cmeas2≦Cmeas2Air. In the case where all 6 conditions are fulfilled, this means that the tank is empty and thus in step 13 the value of the level of the liquid is set to 0 and the process continues with step 20. In the case where at least one of the 6 conditions is not fulfilled, the process continues with step 5.

During step 20,
the measured value Cref1 is stored in a non-volatile memory of the evaluation unit and is assigned to Cref1Air
the measured value Cref2 is stored in a non-volatile memory of the evaluation unit and is assigned to Cref2Air
the measured value Cmeas1 is stored in a non-volatile memory of the evaluation unit and is assigned to Cmeas1Air
the measured value Cmeas2 is stored in a non-volatile memory of the evaluation unit and is assigned to Cmeas2Air After step 20, the process continues with step 19.

Step 19: corresponds to a conversion of the level of the liquid calculated during one of the steps 13 to 18 in a volume of liquid in the tank. The conversion is done from information on the geometry of the tank. The value of the level of the liquid and of the volume of liquid are then sent during step 12 to an engine control unit or to a dashboard. The process further continues with step 2.

Step 5: it is tested if Cref≦0 and Cmes≦0 and Cref1>Cref1Air and Cref2>Cref2Air and Cmeas1>Cmeas1Air and Cmeas2>Cmeas2Air. In the case where all 6 conditions are fulfilled, this means that the tank is full and thus in step 14 a value of the maximum level of the liquid and is assigned to the level of liquid and the process continues with step 19. In the case where at least one of the 6 conditions if not fulfilled, the process further continues with step 6.

Step 6: it is tested if Cref>0 and Cmeas≦0 and Cmeas1≦Cmeas1Air and Cmeas2≦Cmeas2Air. In the case where all 4 conditions are fulfilled, this corresponds to scenario i) described above and the level of liquid is calculated with formula lev1=K1*(Cref1−Cref2) (step 15) and the process further continues with step 21. In the case where at least one of 4 conditions is not fulfilled, the process continues with step 7.

During step 21,
the measured value Cref2 is stored in a non-volatile memory of the evaluation unit and is assigned to Cref2Air
the measured value Cmeas1 is stored in a non-volatile memory of the evaluation unit and is assigned to Cmeas1Air
the measured value Cmeas2 is stored in a non-volatile memory of the evaluation unit and is assigned to Cmeas2Air After step 21, the process further continues with step 19, then step 12, then again with step 2.

Step 7: it is tested if Cref>0 and Cmeas≦0 and Cmeas1>Cmeas1Air and Cmeas2>Cmeas2Air. In the case where all 4 conditions are fulfilled, this corresponds to scenario iv) and the level of liquid is calculated with formula lev4=lev3$_{max}$+K4*(Cref2−Cref1Air) (step 16) and the process further continues with step 19. In the case where at least one of the 4 conditions is not fulfilled, the process continues with step 8.

Step 8: it is tested Cref>0 and Cmeas>0 and Cmeas1>Cmeas1Air and Cmeas2≦Cmeas2Air. In the case where all 4 conditions are fulfilled, this corresponds to scenario ii) and the level of liquid is calculated with formula $$lev2 = lev1_{max} + K2 \times \frac{(Cmeas1 - Cmeas2)}{(Cref1 - Cref2)}$$

(step 17) and the process further continues with step 22. in the case where at least one of the 4 conditions is not fulfilled, the process further continues with step 9.

During step 22,
the measured value Cref2 is stored in a non-volatile memory of the evaluation unit and is assigned to Cref2Air
the measured value Cmeas2 is stored in a non-volatile memory of the evaluation unit and is assigned to Cmeas2Air After step 22, the process further continues with step 19, then step 12, then again with step 2.

Step 9: it is tested if Cref>0 and Cmeas>0 and Cmeas1>Cmeas1Air and Cmeas2>Cmeas2Air. In the case where all 4 conditions are fulfilled, this corresponds to scenario iii) and the level of liquid is calculated with formula $$lev3 = lev2_{max} + K3 \times \frac{(Cmeas2 - Cmeas1Air)}{(Cref1 - Cref2)}$$

(step 18) and the process further continues with step 23. In the case where at least one of the 4 conditions is not fulfilled, the process continues with step 10.

During step 23, the measured value Cref2 is stored in a non-volatile memory of the evaluation unit and is assigned to Cref2Air. After step 23, the process further continues with step 19, then step 12, then again with step 2.

Step 10: corresponds to a situation of default of the gauge. In this case, an information on the gauge default is sent to the engine control unit or to the dashboard of the vehicle and the process continues with step 2 where new values of the 2 measurement capacitors and of the 2 reference capacitors are measured.

REFERENCE SIGNS 10 capacitive gauge
12 support
14 first end
16 second end
18 connection terminals
20 evaluation unit
22 first reference capacitor
24 first measurement capacitor
26 second measurement capacitor
28 second reference capacitor
30 median line

The invention claimed is:

1. A process for measuring a liquid level in a tank that consists in:
   positioning, in the tank, two reference capacitors that are substantially identical and two measurement capacitors that are also substantially identical in such a way that, when the tank is full, the 4 capacitors are submerged and that, when the liquid level in the tank falls, a measurement capacitor/reference capacitor pair (Cmeas2, Cref2) emerges before another pair of capacitors (Cmeas1, Cref1);
   when the 4 capacitors Cmeas1, Cref1, Cmeas2, Cref2 are in air, measuring the 4 capacitors in air; and
   when at least one capacitor is at least partly immersed in the liquid, measuring the value of said capacitor, measuring the values of the other capacitors and calculating the liquid level in the tank from the measured value of the capacitor partly immersed in the liquid, the value in air measured previously of the capacitor partly immersed in the liquid and the measured values of the other capacitors.

2. The measurement process according to claim 1, where the values in air of the reference and the measurement capacitors Cref1Air, Cref2Air, Cmeas1Air, Cmeas2Air have been measured and stored in the memory of an evaluation unit, said capacitors being positioned in the tank so as to cover the entire height of the tank continuously and so that, when the liquid level in the tank falls, these capacitors begin respectively to emerge at the maximum fill height of the tank $lev4_{max}$ for Cref2 and at levels $lev3_{max}$ for Cmeas2, $lev2_{max}$ for Cmeas1 and $lev1_{max}$ for Cref1 with $lev4_{max} > lev3_{max} > lev2_{max} > lev1_{max}$, said process using the evaluation unit to carry out the following steps:
   a) measuring the value of all the capacitors Cref1, Cref2, Cmeas1, Cmeas2 and evaluating which are completely in air by comparison in pairs: Cref2 with Cref1 and Cmeas2 with Cmeas1;
   b) calculating the liquid level in the tank from the following formulae:

$$lev1 = K1 \times (Cref1 - Cref2)$$

when only the first reference capacitor is at least partly immersed in the liquid;

$$lev2 = lev1_{max} + K2 \times \frac{(Cmeas1 - Cmeas2)}{(Cref1 - Cref2)}$$

when the first reference capacitor is submerged and the first measurement capacitor is, in addition, at least partly immersed in the liquid;

$$lev3 = lev2_{max} + K3 \times \frac{(Cmeas2 - Cmeas1Air)}{(Cref1 - Cref2)}$$

when the first reference capacitor and the first measurement capacitor are submerged and the second measurement capacitor is, in addition, at least partly immersed in the liquid; and $$lev4 = lev3_{max} + K4 \times (Cref2 - Cref1Air)$$

when the first reference capacitor, the first measurement capacitor and the second measurement capacitor are submerged and the second reference capacitor is, in addition, at least partly immersed in the liquid,
K1, K2, K3 and K4 being proportionality coefficients that depend on the geometry of the capacitive gauge and Cmeas1Air and Cref1Air being the values of Cmeas1 and Cref1 effectively measured when these have been completely exposed to the air; and
   c) replacing, in the memory, the values of the capacitors in air stored previously with their measured value, where appropriate.

3. A system for measuring a liquid level in a tank suitable for a process according to claim 1, the system comprising:
   a capacitive gauge with a first measurement capacitor (Cmeas1) and a first reference capacitor (Cref1); and
   an evaluation unit connected to the capacitive gauge with a calculation means for calculating the liquid level based on signals coming from the capacitive gauge,
wherein the capacitive gauge comprises, in addition, a second measurement capacitor (Cmeas2) substantially identical to Cmeas1 and a second reference capacitor (Cref2) substantially identical to Cref1.

4. The measurement system according to claim 3, in which the capacitive gauge comprises a support with a first end and a second end, the various capacitors being positioned on the support in the following order, going from the first end towards the second end:
   first reference capacitor (Cref1);
   first measurement capacitor (Cmeas1);
   second measurement capacitor (Cmeas2); and
   second reference capacitor (Cref2).

5. The measurement system according to claim 4, in which the various capacitors are positioned on the support symmetrically relative to a median line located between the first end and the second end.

6. The measurement system according to claim 3, in which the reference capacitors each cover a substantially smaller area than that which each of the measurement capacitors covers.

7. The measurement system according to claim 3, in which the measurement capacitors, or the reference capacitors, or both measurement and reference capacitors are formed by two interdigital electrodes.

8. The measurement system according to claim 7, comprising connection terminals to connect the measurement and reference capacitors to the evaluation unit.

9. The measurement system according to claim 3, in which the evaluation unit comprises a memory to temporarily store the values of the various capacitors measured in air.

* * * * *